T. O. ORGAN.
GREASE CUP.
APPLICATION FILED OCT. 11, 1913.

1,104,540.

Patented July 21, 1914.

WITNESSES

INVENTOR
Thomas O. Organ
BY
ATTORNEYS

UNITED STATES PATENT OFFICE.

THOMAS OPIE ORGAN, OF GERMANTOWN, PENNSYLVANIA.

GREASE-CUP.

1,104,540.     Specification of Letters Patent.     Patented July 21, 1914.

Application filed October 11, 1913. Serial No. 794,613.

*To all whom it may concern:*

Be it known that I, THOMAS O. ORGAN, a citizen of the United States, and a resident of Germantown, in the county of Philadelphia and State of Pennsylvania, have invented a new and Improved Grease-Cup, of which the following is a full, clear, and exact description.

My invention relates to a grease cup of the type in which a plunger or follower is employed, the movement of which in the cup serves to discharge the grease through a central feed tube to the bore of the stem by which the cup is secured to the machine element to be lubricated.

Cups of the indicated character are usually so constructed as to involve a stem of considerable length between the bottom of the cup body and the piece of machinery to be lubricated, and when the cup is applied to a revolving element, a breakage of the stem is liable to result under centrifugal force.

It is a design of my invention to provide a grease cup employing a plunger to discharge the grease, and so constructed that a rigid stem or shank of minimum length may be formed between the cup and the part to be lubricated, thus greatly reducing or overcoming the liability of breakage under centrifugal force.

It is a further design of my invention to provide a grease cup of the indicated character in which the grease will have less tendency to change its density and harden against the follower and the top of the cup, for which purpose I give the follower the form of a ring surrounding the central discharge tube and arranged to move on said tube, whereby to cause the grease to be rolled over from all sides in the direction of the discharge tube.

The invention will be particularly explained in the specific description following.

Reference is to be had to the accompanying drawings forming a part of this specification, in which similar characters of reference indicate corresponding parts in all the views.

Figure 1:
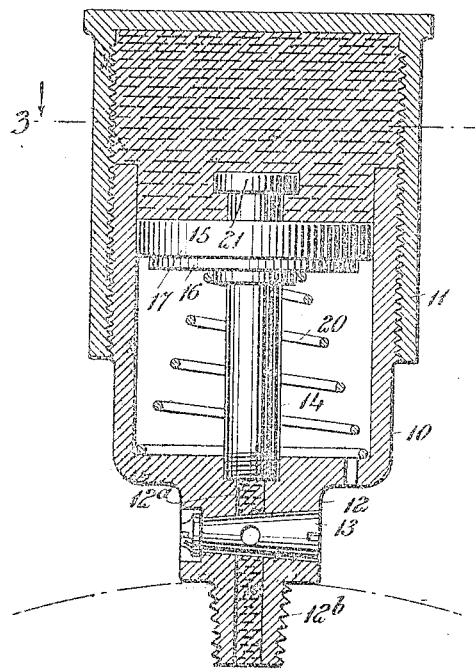
Figure 2:
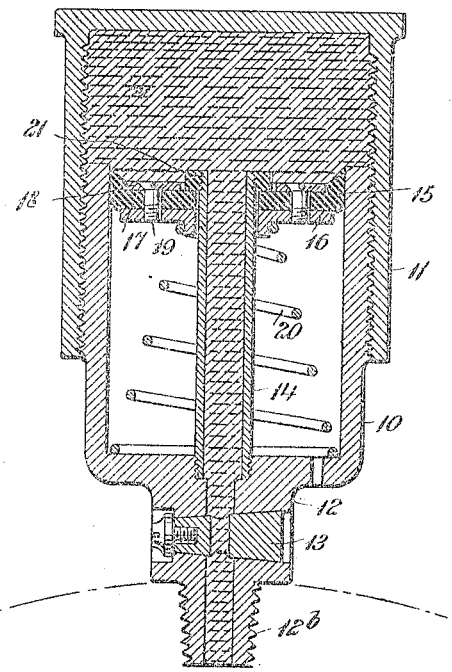
Figure 3:
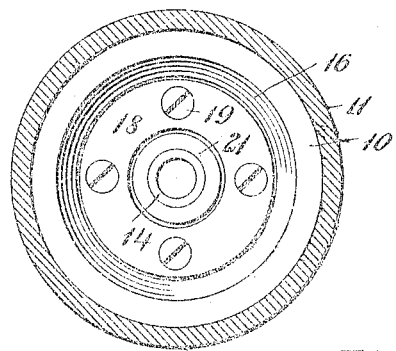

Figure 1 is a vertical section of a grease cup embodying my invention, showing the follower in a partly raised position; Fig. 2 is a similar view with the follower in the uppermost position; and Fig. 3 is a cross section on the line 3—3 of Fig. 1.

In constructing the grease cup in accordance with my invention, a suitable body 10 is provided, open at the top and provided on the bottom with a stem 12 having a through-bore $12^a$ controlled by a plug 13, the lower end of the stem having a threaded nipple $12^b$ to enter the machine element to be lubricated. The upper end of the cup 10 is exteriorly threaded and receives an interiorly threaded cup-shaped cover 11.

Disposed centrally in the cup 10 is an upright discharge tube 14, the lower end of which is threaded into the bottom of the cup 10 co-axial with the bore $12^a$ of the stem 12. On the tube 14 is fitted a ring follower or plunger designated generally by the numeral 15, and which may comprise a bottom plate 16, a cup leather 17, and an upper clamp ring 18, the whole being clamped together by screws 19 or the like. A helical spring 20 surrounds the discharge tube 14 below the ring follower 15, the lower end of the spring resting on the bottom of the cup 10, and the upper end abutting against the under side of the follower. On the upper end of the discharge tube 14 is a nut 21 which forms a stop for limiting the upward movement of the follower 15 under the pressure of the spring 20.

It will be observed that the discharge tube 14 within the cup is a rigid fixture and that neither the said tube nor the plunger presents any member movable within the stem 12, nor is there any exterior element of the cup movable on the stem 12, the result being that the stem may be made very short, whereby to possess increased strength to resist centrifugal force. The guiding of the plunger or follower is effected through the fixed discharge tube 14 within the cup.

In use, the grease may be placed in the cup-shaped cover 11, which is filled or substantially filled and then inverted and screwed down onto the body of the cup 10, the downward movement of the cover serving to cause the grease to press the follower 15 downwardly and place the spring 20 under tension. The reaction of the spring tends to force the follower upwardly as rapidly as the control of the bore $12^a$ in the stem by the plug 13 will permit the outflow of the grease to the element to be lubricated. In the upward movement of the ring piston the grease is caused to roll inwardly from all sides toward the simple discharge tube. When the follower has reached the limit of its upward movement, by engaging the stop nut 21, the cover 11 may be screwed downwardly once more to again depress the follower, this operation being repeated until the grease is substantially all discharged.

Having thus described my invention, I claim as new and desire to secure by Letters Patent:

1. A grease cup, comprising a hollow body open at the upper end and having a stem depending from the bottom thereof, the said stem having an outlet bore, a discharge tube fixedly secured to the bottom of the cup in communication with the outlet bore, said tube rising in the interior of the cup, a ring follower surrounding the discharge tube and movable up and down thereon, means to cause the follower to be raised, and a cup-shaped cover forming a closure for the upper end of the cup.

2. A grease cup having a hollow body open at the top, and a securing stem depending from the bottom thereof and formed with an outlet port, a fixed discharge tube in axial alinement with the outlet port and rising in the interior of the cup, a stop nut on the upper end of the discharge tube, and a ring follower in the cup and surrounding the discharge tube to have sliding up and down movement thereon, means for causing an upward pressure on the under side of the ring follower to cause the same to rise, and a cup-shaped cover interiorly threaded, the cup body having an external thread to receive the thread of the cover.

In testimony whereof I have signed my name to this specification in the presence of two subscribing witnesses.

THOMAS OPIE ORGAN.

Witnesses:
AUGUSTUS C. BUZBY,
HAROLD A. BUZBY.